United States Patent
Lürkens

[19]

[11] Patent Number: 6,107,773
[45] Date of Patent: Aug. 22, 2000

[54] CIRCUIT ARRANGEMENT FOR FEEDING A LOAD

[75] Inventor: Peter Lürkens, Aachen, Germany

[73] Assignee: U.S. Philips Corporation, New York, N.Y.

[21] Appl. No.: 09/108,645

[22] Filed: Jul. 1, 1998

[30] Foreign Application Priority Data

Jul. 11, 1997 [DE] Germany .................... 197 29 705

[51] Int. Cl.[7] ................................................ H02P 5/34
[52] U.S. Cl. ........................................ 318/801; 318/798
[58] Field of Search ................ 318/798, 800–802, 318/806, 811, 812, 254; 363/37, 35, 51, 58, 127

[56] References Cited

U.S. PATENT DOCUMENTS

| | | | |
|---|---|---|---|
| 4,473,790 | 9/1984 | Plunkett et al. | 318/798 |
| 4,716,515 | 12/1987 | Alexander | 363/138 |
| 4,788,635 | 11/1988 | Heinrich | 363/35 |
| 5,245,522 | 9/1993 | Kawaguchi | 363/37 |
| 5,298,847 | 3/1994 | Kerkman et al. | 318/800 |
| 5,471,125 | 11/1995 | Wu | 318/803 |
| 5,576,606 | 11/1996 | Phuoc et al. | 318/801 |

*Primary Examiner*—Robert E. Nappi
*Assistant Examiner*—Rina I. Duda
*Attorney, Agent, or Firm*—Ernestine C. Bartlett; Bernard Franzblau

[57] ABSTRACT

A circuit arrangement for feeding a single-phase or multi-phase load from a sinusoidal alternating voltage energy supply mains which carries an at least having a frequency for which the load has a substantially resistive behavior. The circuit arrangement includes a full-wave rectifier stage for deriving a substantially sinusoidal intermediate circuit voltage, a modulation stage, for example, a single-phase or multi-phase inverter, which generates from the intermediate circuit voltage, under the control of a control signal whose frequency is high relative to the frequency of the mains alternating voltage, at least one high-frequency supply voltage which is applied to the load. The supply voltage (voltages) is determined from the product of the control signal and the intermediate circuit voltage. A high-frequency filter stage is coupled to the full-wave rectifier stage so as to suppress interference induced into the energy supply mains in a frequency range which includes the frequency of the control signal. This simple circuit arrangement ensures a mains current containing few harmonics.

16 Claims, 2 Drawing Sheets

CIRCUIT ARRANGEMENT FOR FEEDING A LOAD

BACKGROUND OF THE INVENTION

This invention relates to a circuit arrangement for feeding a single-phase or multi-phase load from an energy supply mains which carries an at least substantially sine-wave mains alternating voltage.

When electronic energy converters are fed from an energy supply mains constructed as a single-phase alternating current mains, a full-wave bridge rectifier circuit with a subsequent storage capacitor are often used at the mains side. This bridge rectifier circuit, also referred to as a Graetz bridge, ensures that a mains current for recharging the storage capacitor flows from the energy supply mains only if when the instantaneous value of the voltage in the energy supply mains is greater than the voltage across the storage capacitor. A pronounced pulse-like current is thus drawn from the energy supply mains, the mean value of said current corresponding to the mean value of the current drawn from the storage capacitor by a load. The mains current thus formed, drawn from the energy supply mains, has a high harmonic content. If such a Graetz bridge is used to operate a high-power load, the harmonic content will very quickly exceed a limit specified as the highest permissible harmonic content by the operators of the energy supply mains. Loads generating a mains current with a higher harmonic content are not permissible, considering the directives imposed by the operators of energy supply mains and also considering the prevailing national and European standards.

It is known to connect a filter choke downstream from a Graetz bridge; such a choke achieves smoothing of the mains current and hence a reduction of the harmonic content. However, such a filter choke becomes very voluminous and heavy in the case of high powers. This has an adverse effect on the compactness and weight of apparatus equipped with such power supply units.

The publication "Schaltnetzteile" by W. Hirschmann and A. Hauenstein, published by Siemens, ISBN No. 3-8009-1550-2, section 6.4, pp. 441 to 444, describes an up-converter which draws a current. This arrangement, also referred to as a preconditioner, includes an electronic power switch, a high-frequency choke and a very fast switching diode. The power switch must be driven by an appropriate control circuit which controls the mains current in a sine-wave fashion without causing a significant fluctuation of the voltage in the intermediate circuit, i.e. downstream from the Graetz bridge. When the control circuit is suitably conceived, the cited circuit arrangement should enable a sine-wave mains current, the harmonics in the mains current should be at least substantially suppressable, irrespective of a load connected to this circuit arrangement, and it should also be possible to keep the power of the load constant in conformity with the at least approximately constant voltage in the intermediate circuit. A comparatively complex circuit means, however, is required for these purposes.

In many cases it is not necessary to feed a load with a power which is constant in time. It often suffices for the instantaneous value of this power to fluctuate about a mean value, for example, at double the mains frequency. The use of the above-mentioned preconditioner would be particularly disadvantageous in such cases.

SUMMARY OF THE INVENTION

It is an object of the invention to provide a circuit arrangement which serves to feed a load from an energy supply mains and ensures a mains current with few harmonics while utilizing simple means.

This object is achieved according to the invention by means of a circuit arrangement for feeding a single-phase or multi-phase load from an energy supply mains which carries an at least substantially sine-wave alternating mains voltage for the frequency of which the load has an at least substantially resistive behavior, which circuit arrangement includes:

- a full-wave rectifier stage for deriving an at least substantially sinusoidal intermediate circuit voltage,
- a modulation stage which is constructed as a single-phase or multi-phase inverter which generates from the intermediate circuit voltage, under the control of a control signal whose frequency is high relative to the frequency of the mains alternating voltage, at least one high-frequency supply voltage which is to be applied to the load, the supply voltage (voltages) being determined from the product of the control signal and the intermediate circuit voltage, and
- a high-frequency filter stage which is coupled to the full-wave rectifier stage so as to suppress interference induced into the energy supply mains in a frequency range which includes the frequency of the control signal.

The invention utilizes the recognition of the fact that a sine-wave mains current for an ohmic resistor which serves as a load downstream from a power supply with a Graetz bridge can be very simply obtained by omitting the above-mentioned capacitor in the intermediate circuit, i.e. in the connection to the Graetz bridge. The voltage in the intermediate circuit then always assumes the absolute value of the mains voltage of the energy supply mains and the mains current is proportional to the mains voltage. For loads exhibiting an essentially resistive behavior in a predetermined frequency range around the mains frequency, the circuit arrangement according to the invention also generates a sine-wave mains current. Such loads may be formed, for example, by high-frequency switched DC/DC converters with a resistive load, but also by very fast motors which are fed by an AC/DC converter, for example asynchronous motors and permanent magnet motors. The frequency range in which the loads exhibit an essentially resistive behavior may be chosen, for example from 0 to 2 kHz. This choice is in conformity with the regulations concerning the limitation of the harmonics. The frequency at which, for example, the high-frequency switched DC/DC converters operate will generally be high in relation to the upper limit of said frequency range.

In the circuit arrangement according to the invention, the power taken up by the load is always proportional to the square of the intermediate circuit voltage which is applied to the modulation stage as an input voltage. Because the circuit arrangement according to the invention does not include an energy store which stores a significant amount of energy at the mains frequency, it follows that the mains voltage and the mains current are proportional. Thus, in the case of a sine-wave mains voltage there will also be obtained a sine-wave mains current. The high frequency filter stage coupled to the full-wave rectifier stage serves merely to suppress interference at the frequency of the control signal. This high-frequency filter stage preferably includes a very small inductance and a very small capacitance, for example connected downstream from the full-wave rectifier stage. If desired, the inductance can also be inserted in the connection between the energy supply mains and the full-wave rectifier stage. The inductance and the capacitance are both proportioned in such a manner that the current components taken up thereby are small in relation to the ohmic current through the load.

In circuit arrangements of the kind according to the invention, often the problem is encountered that the impedance of the load is very low in the case of low frequencies, i.e. also at the mains frequency of the energy supply mains. This case occurs, for example, when the load includes transformers, very fast motors or the like. Because these loads are regularly proportioned for the high-frequency supply voltage, at low frequencies inherently a low impedance occurs in most cases.

In the circuit arrangement according to the invention, the high-frequency supply voltages for the load are determined from the product of the high-frequency control signal and the sinusoidal intermediate circuit voltage. Therefore, the high-frequency supply voltages have a sinusoidal envelope. This means that the supply voltages have side bands which are symmetrically situated relative to the frequency of the control signal. These side bands also contain components at very low frequencies. This is because the sinusoidal intermediate circuit voltage itself is not spectrally pure, but has components at all even multiples of the mains frequency. The mixed products of these spectral components with the control signal also lie at very low frequencies. In the load with a low impedance these low-frequency spectral components can produce significant low-frequency currents at low frequencies. These currents retroact, via the modulation stage, on the full-wave rectifier stage in which they can cancel the suppression of the harmonics.

This drawback could be avoided by applying directly the sine-wave mains voltage to the modulator instead of the sinusoidal voltage in the intermediate circuit. For the processing of the sine-wave mains voltage, however, the modulation stage should include power switches which are suitable for each voltage and current direction. Such a circuit arrangement is also referred to as a direct AC converter. AC converters of this kind, however, are definitely more intricate than a modulation stage for only one current or voltage polarity.

In order to avoid the interference caused by the sinusoidal voltage in the intermediate circuit, a further embodiment of the invention is provided with a control signal inversion stage which reverses the sign (i.e. polarity) of the control signal from one half period of the mains alternating voltage to the next. As a result of this step, the same effect can be achieved as by means of a direct AC converter. The sign of the control signal is reversed at each zero-crossing of the mains voltage. Because the modulation stage operates like a multiplier, it has the same effect as if the voltage in the intermediate circuit were to vary no longer sinusoidally but purely as a sine wave. The side bands in the spectrum of the supply voltages delivered by the modulation stage are thus reduced to two spectral lines only, said lines being situated to both sides of the frequency of the control signal at a distance from the mains frequency. Therefore, low-frequency components no longer occur in these side bands. Low-frequency currents are thus avoided in the load and, consequently, also interference which could be induced by reconversion, via the modulation stage, into the full-wave rectifier stage and hence into the energy supply mains.

Preferably, the control signal inversion stage includes a sign detection stage for detecting the instantaneous polarity of the mains alternating voltage and for supplying a sign signal which indicates the relevant polarity, as well as a multiplication stage for generating a sign-corrected control signal by multiplication of the control signal by the sign signal.

The sign detection stage in this embodiment of the invention acts as a measuring circuit which determines the polarity of the mains alternating voltage. The sign detection stage generates a signal which corresponds to the value +1 or −1. This signal is applied to the multiplication stage in which it is used to reverse the polarity of the control signal in response to each zero-crossing of the mains alternating voltage.

If the control signal in a further embodiment of the circuit arrangement according to the invention is already available as a binary switching signal, for example, so that it can also be advantageously used directly as a switching signal for power transistors, the control signal inversion stage is preferably provided with an inverter which can be switched by means of the sign signal and is traversed by the control signal. This switchable inverter then takes the place of the multiplication stage and may be constructed as an exclusive-OR gate in the simplest case.

BRIEF DESCRIPTION OF THE DRAWINGS

Embodiments of the invention will be described in detail hereinafter with reference to the accompanying drawing. Therein, corresponding elements are denoted by identical references.

DESCRIPTION OF THE PREFERRED EMBODIMENTS

Figure 1:
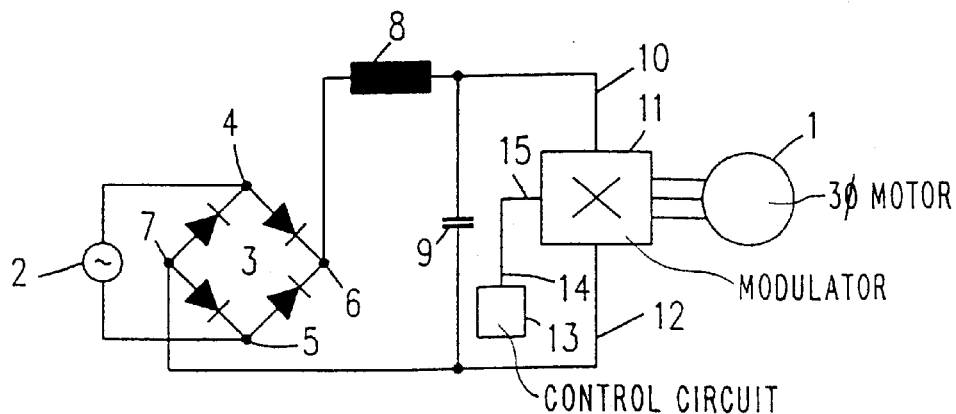
FIG. 1 shows a first embodiment of the invention.

FIG. 1 shows a circuit arrangement for feeding a load 1, being a three-phase load in the present case, for example, a three-phase motor, from an energy supply mains 2 which is shown as an alternating voltage source in the form of its simplified equivalent diagram. A full-wave rectifier stage 3, for example, a Graetz bridge, is connected to the energy supply mains 2 by way of its alternating voltage terminals 4, 5. A first direct voltage terminal 6, carrying a positive voltage level during operation of the Graetz bridge and referred to hereinafter as the positive pole of the Graetz bridge, is connected, via an inductance 8, to a first supply voltage terminal 10 of a modulation stage 11. A second direct voltage terminal 7 of the Graetz bridge 3, carrying a negative voltage level and referred to hereinafter as the negative pole 7, is connected to a second supply voltage terminal 12 of the modulation stage 11. The supply voltage terminals 10, 12 of the modulation stage 11, furthermore, are bridged by a capacitance 9. A control signal generating stage 13 is connected, by way of its output 14, to a control signal input 15 of the modulation stage 11. During operation of the circuit arrangement shown in FIG. 1, the Graetz bridge 3 receives an at least substantially sinusoidal mains alternating voltage via the alternating voltage terminals 4, 5. The Graetz bridge outputs the rectified mains alternating voltage as a rectified sinusoidal intermediate circuit voltage via the direct voltage terminals 6, 7. This intermediate circuit voltage is present between the positive pole 6 and the negative pole 7 of the Graetz bridge 3. The inductance 8 is proportioned such that at the frequency of the mains alternating voltage and the rated current of the load this inductance has a voltage drop which is small in comparison with the mains alternating voltage, and at the frequency of the mains alternating voltage the capacitance 9 draws a current which is small in comparison with the load current. The inductance 8 and the capacitance 9 thus exert a negligibly small effect only on the temporal variation of the intermediate circuit voltage. The sinusoidal intermediate circuit voltage is thus applied to the supply voltage terminals 10, 12 of the modulation stage 11 substantially without modification.

The control signal generating stage 13 outputs, via the output 14, a control signal whose frequency is high in comparison with the mains alternating voltage, said control signal being applied to the control signal input 15 of the modulation stage 11. The modulation stage is constructed as a three-phase AC/DC converter. In the modulation stage 11 three high-frequency supply voltages are generated from the intermediate circuit voltage in conformity with the control signal, each of said supply voltages being applied from the modulation stage 11 to the load 1 via a respective connection lead. The load 1 is thus fed with energy. The motor which is shown as an example of the load 1 may be constructed as an asynchronous motor or as a reluctance motor. The control signal from the control signal generating stage 13 generates the high-frequency supply voltages for such a motor in such a known manner that the motor operates at the desired speed and with the desired torque. The supply voltages for the load 1 are then determined from the product of the control signal at the control signal input 15 and the intermediate circuit voltage at the supply voltage terminals 10, 12.

The inductance 8 and the capacitance 9 are proportioned in such a manner that they form a high-frequency filter stage for suppressing interference which occurs notably at the frequency of the control signal. Such interference, caused by the control signal, is effectively isolated from the energy supply mains 2 by the high-frequency filter stage 8, 9.

Because the inductance 8 and the capacitance 9 are not significant as an energy store for the frequency of the mains alternating voltage, the variation of the intermediate circuit voltage is very close to sinusoidal. For a resistive behavior of the load 1, the power taken up thereby is always proportional to the square of the instantaneous value of the intermediate circuit voltage, i.e. the voltage across the supply voltage terminals 10, 12 of the modulation stage 11. Therefore, the mains alternating voltage and the current drawn from the energy supply mains are also proportional to one another. In the case of a sine-wave mains alternating voltage, the required sine-wave variation of the current drawn from the energy supply mains is thus achieved.

In an alternative version of FIG. 1, the inductance 8 can also be inserted in one of the leads between the energy supply mains 2 and the Graetz bridge 3.

Figure 2:
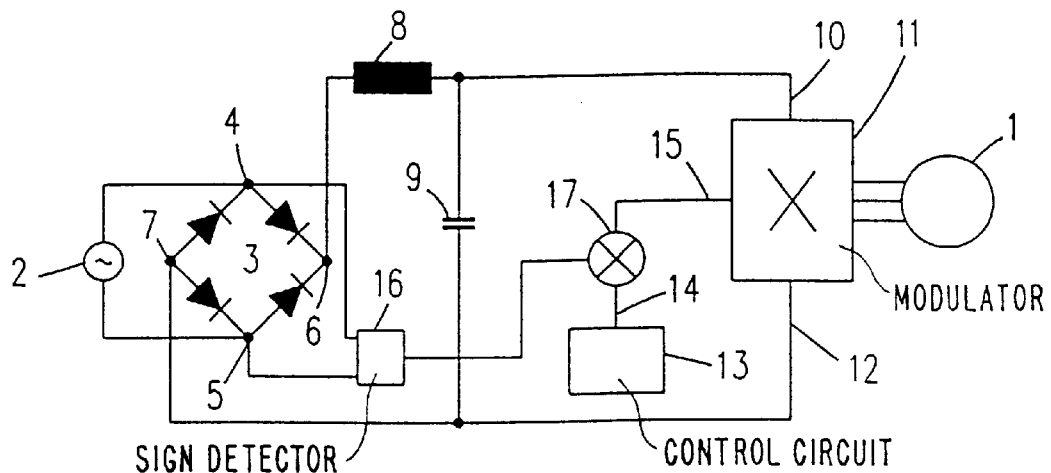
FIG. 2 shows a second embodiment of the invention.

FIG. 2 shows an alternative version of the circuit arrangement of FIG. 1. FIG. 1 has now been supplemented by a control signal inversion stage. The control signal inversion stage includes a sign detection stage 16 whose inputs are connected to the alternating voltage terminals 4, 5 of the Graetz bridge 3, as well as a multiplication stage 17 which is inserted in the connection between the output 14 of the control signal generating stage 13 and the control signal input 15 of the modulation stage 11. An input of the multiplication stage 17 is connected to the output 14 and the control signal input 15 is connected to an output of the multiplication stage 17. A second input of the multiplication stage 17 is connected to an output of the sign detection stage 16.

During operation of the circuit arrangement shown in FIG. 2, the polarity of the mains alternating voltage applied to the sign detection stage 16 is measured therein. The sign detection stage 16 outputs a sign signal which indicates the polarity of the mains alternating voltage. This sign signal is multiplied by the control signal in the multiplication stage 17, yielding a sign-corrected control signal which is applied to the control signal input 15 of the modulation stage 11. In the sign-corrected control signal the polarity of the control signal from the output 14 of the control signal generating stage 13 is reversed at each zero-crossing of the mains alternating voltage.

The operation of the control signal inversion stage 16, 17 is illustrated on the basis of a simplified example shown in FIG. 4. FIG. 4a) shows the sine-wave mains alternating voltage; FIG. 4b) shows the sinusoidal variation of the intermediate circuit voltage which is derived therefrom by full-wave rectification (rectified sinusoidal voltage). FIG. 4c) shows a simplified, square-wave variation for a high-frequency control signal, plotted on the same time axis t as the diagrams of FIGS. 4a) and 4b). The variation shown in FIG. 4c) corresponds, for example, to a control signal at the output 14 of the control signal generating stage 13. Multiplication of the signals of the FIGS. 4b) and 4c) yields the signal variation of FIG. 4d), formed by a solid line, as a diagrammatic representation of a supply voltage for the load 1.

Figure 4A:
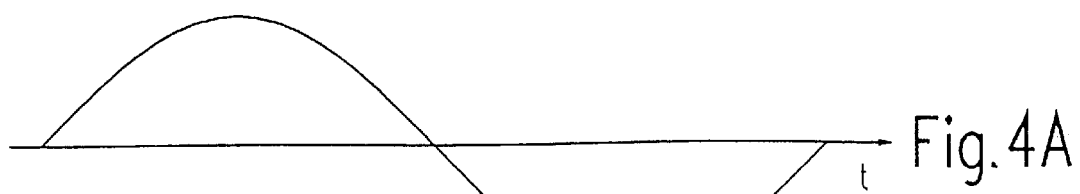
FIG. 4 shows diagrammatically some waveforms so as to illustrate the operation of the circuit arrangements shown in FIGS. 1 and 2.
Figure 4B:
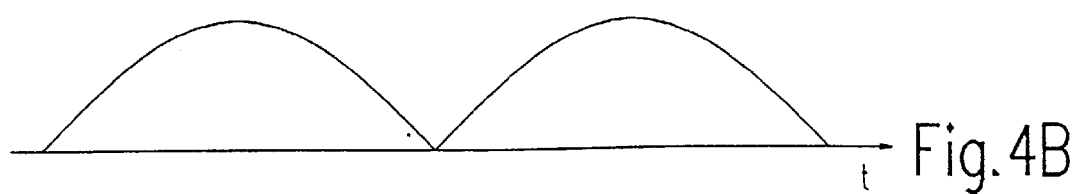
Figure 4C:
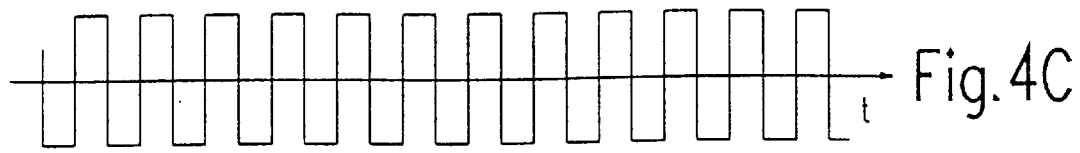
Figure 4D:
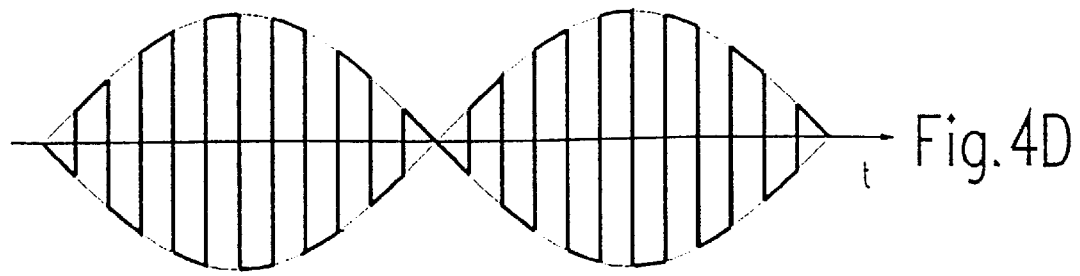
Figure 4E:
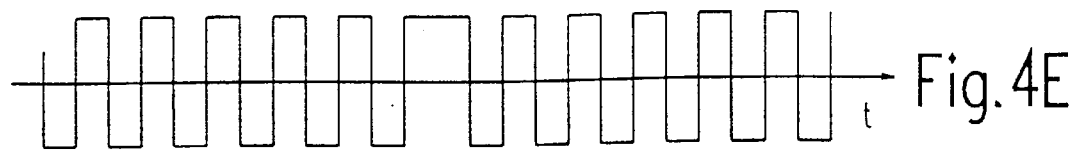
Figure 4F:
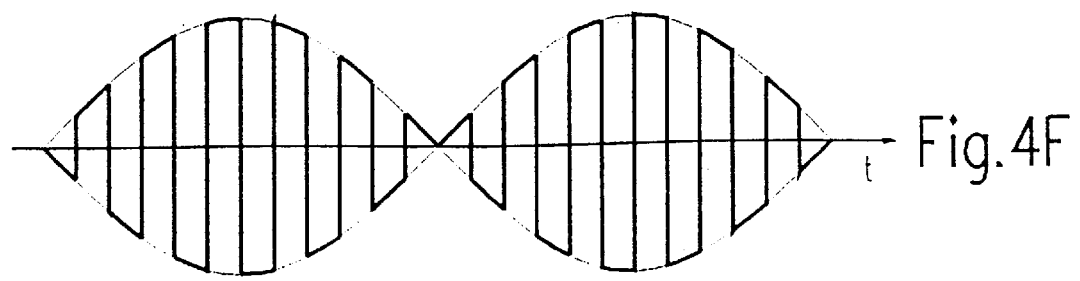

In contrast therewith, FIG. 4e) shows a sign-corrected control signal whose sign changes at the zero-crossing of the mains alternating voltage according to FIG. 4a). When the sign-corrected control signal of FIG. 4e) is multiplied by the sinusoidal intermediate circuit voltage of FIG. 4b), the voltage variation denoted by a solid line in FIG. 4f) is obtained as the resultant supply voltage. The high-frequency supply voltage of FIG. 4f) exhibits an inversion of sign at the zero-crossing of the mains alternating voltage of FIG. 4a), relative to the variation shown in FIG. 4d), so that the supply voltages shown in the FIGS. 4d) and 4f) vary in phase opposition during the entire second half-wave of the mains alternating voltage.

Figure 3:
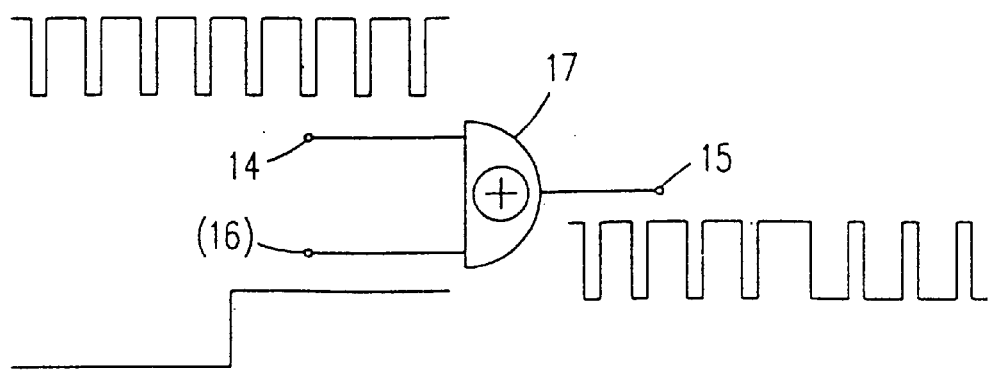
FIG. 3 shows an alternative version of a part of the second embodiment.

FIG. 3 shows a particularly simple embodiment of the multiplication stage 17 in the case where the control signal is a binary signal. This control signal from the output 14 is diagrammatically shown in FIG. 3 as a square-wave signal having a pulse-duty factor which deviates from 1 (for the sake of clarity). It is applied to the first input of the multiplication stage 17. The sign signal from the sign detection stage 16 is applied to the second input of the multiplication stage 17, said sign signal also being a binary signal which changes over between its two signal levels during the zero-crossing of the mains alternating voltage. Consequently, the polarity of the sign-corrected control signal at the output of the multiplication stage 17, i.e. of the exclusive-OR gate, is also reversed. This signal, whose variation is also diagrammatically shown in FIG. 3, is applied to the control signal input 15 of the modulation stage 11.

I claim:

1. A circuit arrangement for feeding a single-phase or multi-phase load from an energy supply mains which carries an at least substantially sine-wave mains alternating voltage for the frequency of which the load has an at least substantially resistive behavior, wherein the circuit arrangement comprises:

a full-wave rectifier stage for deriving an at least substantially rectified sinusoidal intermediate circuit voltage, a modulation stage comprising a single-phase or multi-phase inverter which generates from the intermediate circuit voltage, under the control of a control signal whose frequency is high relative to the frequency of the mains alternating voltage, at least one high-frequency supply voltage which is to be applied to the load, the at least one high-frequency supply voltage being determined from the product of the control signal and the intermediate circuit voltage, and a high-frequency filter stage which is coupled to the full-wave rectifier stage so as to suppress interference induced into the energy supply mains in a frequency range which includes the frequency of the control signal.

2. A circuit arrangement as claimed in claim 1, further comprising a control signal inversion stage which reverses the sign of the control signal from one half period of the mains alternating voltage to the next.

3. A circuit arrangement as claimed in claim 2, wherein the control signal inversion stage comprises:

a sign detection stage for detecting the instantaneous polarity of the mains alternating voltage and for supplying a sign signal which indicates the relevant polarity, and a multiplication stage for generating a sign-corrected control signal by multiplication of the control signal by the sign signal.

4. A circuit arrangement as claimed in claim 2, in which the control signal comprises a binary switching signal, characterized in that in the control signal inversion stage the control signal passes through an inverter which can be switched by the sign signal.

5. A drive system for an electronically commutating motor, comprising:

a circuit arrangement as claimed in claim 1, wherein the load comprises the commutating motor, and means coupling the commutating motor to an output of the modulation stare.

6. An energy supply circuit for a load, the supply circuit comprising:

a pair of input terminals for connection to a source of low frequency AC sinusoidal voltage, a full-wave rectifier circuit coupled to the pair of input terminals for deriving at its DC output terminals a rectified sinusoidal intermediate circuit voltage, a control circuit providing a control signal at a frequency which is high relative to the low frequency AC sinusoidal voltage, an inverter modulation circuit having input means responsive to the rectified sinusoidal intermediate circuit voltage, a control input responsive to the control signal, and an output which provides a high frequency supply voltage for the load and which is determined by the product of the control signal and the intermediate circuit voltage, and a high frequency filter coupled to the full-wave rectifier circuit so as to suppress any interference in a frequency range which includes the high frequency of the control signal.

7. The energy supply circuit as claimed in claim 6 wherein the high frequency filter circuit comprises an inductor serially connected between one DC output terminal of the full-wave rectifier circuit and the input means of the inverter modulation circuit and a capacitor coupled in shunt with said input means.

8. The energy supply circuit as claimed in claim 7 wherein the inductance value of said inductor at the frequency of the low frequency AC voltage produces a voltage drop across the inductor which is small compared to the amplitude of said low frequency AC voltage and the capacitance value of said capacitor at the frequency of the low frequency AC voltage is such that the capacitor draws a small current in comparison to the value of a load current supplied to said load.

9. The energy supply circuit as claimed in claim 6 wherein the high frequency filter circuit comprises an inductor coupled between one input terminal and an AC input terminal of the full-wave rectifier circuit and a capacitor coupled in shunt with said input means of the inverter modulation circuit.

10. The energy supply circuit as claimed in claim 6 wherein at the frequency of the low frequency AC voltage the load substantially has the characteristic of a resistor.

11. The energy supply circuit as claimed in claim 6 wherein the inverter modulation circuit comprises a multiphase inverter and the load is a multiphase load, and said multiphase inverter output provides multiple high frequency supply voltages equal to the number of phases of the multiphase load.

12. The energy supply circuit as claimed in claim 6 further comprises a control signal inversion circuit coupled between the control circuit and the control input of the inverter modulation circuit and which reverses the polarity of the control signal at each zero crossing of the low frequency AC voltage.

13. The energy supply circuit as claimed in claim 12 wherein the control signal inversion circuit comprises:

a sign detection circuit responsive to the low frequency AC voltage for detecting the instantaneous polarity thereof and for supplying a sign signal indicative of said polarity, and a multiplier circuit coupled between the control circuit and the control input of the inverter modulation circuit and having an input which receives said sign signal from the sign detection circuit, whereby the multiplier circuit supplies a sign-corrected signal to said control input which is derived by multiplication of the control signal by the sign signal.

14. The energy supply circuit as claimed in claim 12 wherein the control signal comprises a binary switching signal, and in the control signal inversion stage the control signal passes through an inverter switched by the sign signal.

15. A circuit arrangement as claimed in claim 3, in which the control signal comprises a binary switching signal, characterized in that in the control signal inversion stage the control signal passes through an inverter which can be switched by the sign signal.

16. The energy supply circuit as claimed in claim 6 wherein the control circuit provides a control signal that is independent of load current when a load is coupled to the output of the inverter modulation circuit.

* * * * *